United States Patent [19]
Ulsh

[11] 3,988,125
[45] Oct. 26, 1976

[54] POWER SAW HOLDER
[76] Inventor: John R. Ulsh, Box 143, Summit Station, Pa. 17979
[22] Filed: Feb. 14, 1975
[21] Appl. No.: 549,856

[52] U.S. Cl. .............................. 51/98 R; 83/489; 83/574; 125/14
[51] Int. Cl.² ........................................ B24B 19/00
[58] Field of Search .......... 125/13, 14; 51/37, 98 R; 83/489, 574

[56] References Cited
UNITED STATES PATENTS

| 2,254,046 | 8/1941 | Pearson | 125/13 R |
| 3,621,829 | 11/1971 | Maluck | 125/13 R |
| 3,686,990 | 8/1972 | Margolien | 83/489 X |

FOREIGN PATENTS OR APPLICATIONS

| 236,884 | 3/1960 | Australia | 83/574 |
| 756,637 | 9/1933 | France | 51/98 R |
| 1,361,904 | 4/1964 | France | 125/13 R |
| 496,677 | 4/1930 | Germany | 51/98 R |
| 840,517 | 7/1960 | United Kingdom | 51/98 R |

Primary Examiner—Harold D. Whitehead
Attorney, Agent, or Firm—Howson and Howson

[57] ABSTRACT

A device for rigidly supporting a portable power saw and permitting selective vertical movement thereof for cutting lengths of metal, plastic, wood and the like. A base having a horizontal work surface includes a clamping means for clamping the work to be cut in a predetermined position. An upstanding support post slidably carries a saw support arm to which a portable power saw is secured with the cutting element thereof disposed in a vertical plane. Lever means connected with the saw support arm permits the selective vertical movement of the saw through the clamped worked piece. Spring means are provided to return and retain the saw and saw support arm to a raised position above the work piece.

6 Claims, 9 Drawing Figures

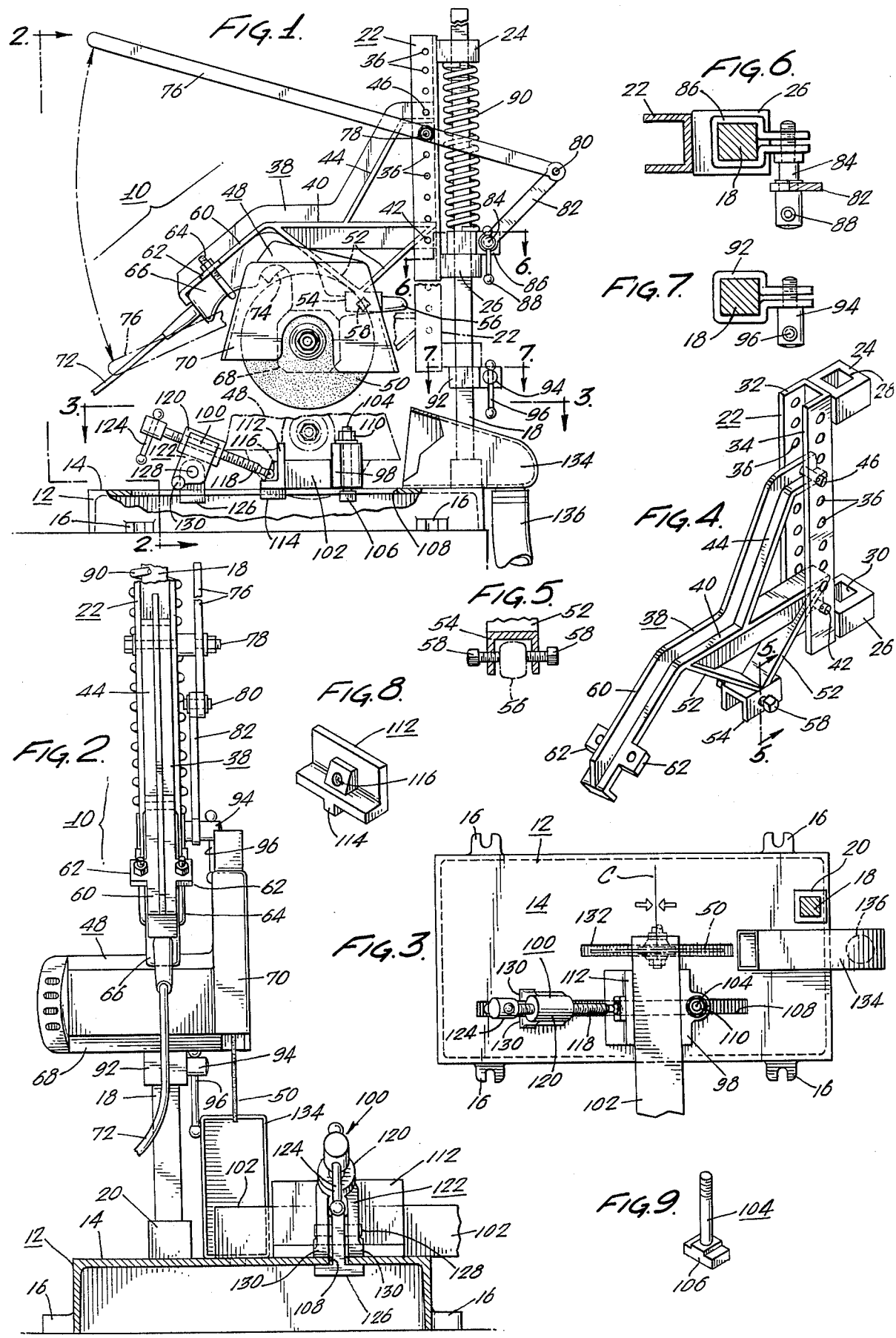

POWER SAW HOLDER

The present invention relates generally to holding devices for portable power saws and relates more particularly to a power saw holder including a mechanism for providing a controlled vertical cutting stroke of the saw through a rigidly held work piece.

Portable electric power saws enjoy a widespread use both in the construction trades and in manufacturing plants for the cutting of wood, metals, plastics, etc. This type of saw characteristically includes a motor, a handle with trigger switch through which the power cord enters the motor housing, a cutting blade or disc secured to the end of the motor shaft, and a protective housing around the portion of the cutting element adjacent the handle. For the cuttting of wood and other relatively soft materials, a toothed saw blade is utilized and provides a rapid cutting action. However, for cutting metals, plastics, and ceramic materials, an abrasive disc or wheel typically made of bonded silicon carbide particles is employed, and the cutting rate is considerably slower. Because such cutting elements are relatively brittle, care must be exercised in their use to prevent damage to the cutting element and injury to the operator. The present device is intended primarily for use in cutting dense materials such as metals which are difficult and tiring to cut with the saw freely held. It should be understood, however, that the device may usefully be employed for the cutting of any materials which can be cut with a portable saw including wood, soft plastics, and the like.

The present invention includes a base providing a horizontal work supporting surface and means for clamping a work piece in the desired position on the surface. An upstanding support post secured to the base slidably supports a saw support arm which extends in cantilever relation therefrom. Means are provided on the saw support arm for clamping a portable electric power saw to the arm with the saw cutting element disposed in a vertical plane. A lever mechanism is provided on the support post connected with the support arm for selectively controlling the downward movement of the saw cutting element through the clamped work piece. Spring means are preferably provided to return the saw and saw support arm to a raised position above the work piece.

It is accordingly a primary object of the present invention to provide a power saw holder which will permit the accurate vertical movement of the saw through a clamped work piece with relatively little operator skill or effort.

A further object of the invention is to provide a saw holder as described which can be used with a variety of different makes and models of power saws and which can be used for cutting any material for which the saw and its cutting element are suited.

Another object of the invention is to provide a saw holder as described of a relatively simple construction which can be economically manufactured.

Additional objects of the invention will be more readily apparent from the following detailed description of an embodiment thereof when taken together with the accompanying drawings wherein:

FIG. 1 is a side elevational view of a power saw holder in accordance with the present invention showing the saw in the raised position prior to the cutting stroke and, in the fragmentary broken line view, in the lowered position upon conclusion of the cutting stroke;

FIG. 2 is an enlarged fragmentary front elevational view partly in section taken along line 2—2 of FIG. 1;

FIG. 3 is a plan view partly in section taken along line 3—3 of FIG. 1;

FIG. 4 is a perspective view of the saw support arm isolated from the support post and operating lever, and with the power saw removed;

FIG. 5 is a partial sectional view taken along line 5—5 of FIG. 4;

FIG. 6 is an enlarged partial sectional view taken along line 6—6 of FIG. 1 showing the manner in which the operating lever linkage is adjustably secured to the support post;

FIG. 7 is an enlarged sectional view taken along line 7—7 of FIG. 1 showing the saw support arm stop;

FIG. 8 is a perspective isolated view of the work piece clamping element; and

FIG. 9 is an isolated perspective view of the locking bolt which anchors the work piece fence.

Referring to the drawings and particularly FIGS. 1–3 thereof, a power saw holder generally designated 10 in accordance with the present invention includes a base 12 having a planar horizontal work table surface 14. Brackets 16 extend outwardly from each side of the base for attachment of the base to a work bench or stand (not shown) to support the saw holder at a convenient working level.

A vertical support post 18 is anchored to the base by a collar 20. The post 18 as shown in FIG. 3 is of square cross-section and is positioned along one edge of the base toward one corner thereof. A saw support arm assembly as shown in FIG. 4 includes a vertical channel member 22 having upper and lower support arm slide elements 24 and 26 secured to the back face thereof. The slide elements 24 and 26 respectively include square vertical apertures 28 and 30 therein of a size sufficient to permit a sliding movement over the square support post 18. The opposed flange portions 32 and 34 of the channel member 22 each include a row of aligned spaced holes 36 for a purpose explained below.

A saw support arm 38 extends horizontally from the channel member 22 and includes a horizontal portion 40, the rear end of which extends between the flange portions 32 and 34 of the channel member 22 and is adjustably secured therebetween by the pin 42. An upwardly extending strut 44 of the support arm 38 is similarly secured to the channel member 22 by a pin 46. The vertical position of the support arm 38 may be adjusted as desired by the removal and replacement of the pins 42 and 46 in the desired holes of the channel member 22.

The support arm 38 is adapted to support a portable power saw 48 (shown in FIGS. 1 and 2) with the cutting element 50 thereof disposed in a vertical plane. The means on the support arm 38 for attachment of the saw 48 include the downwardly converging struts 52 which at their lower end support a downwardly facing channel member 54 within which frame member 56 of the saw is held by clamping screws 58 as shown in FIG. 5. A forwardly and downwardly extending portion 60 of the support arm 38 includes ears 62 having holes therein adapted to receive a U-bolt 64 which as shown in FIGS. 1 and 2 engages the handle 66 of the power saw and, in conjunction with the screws 58, holds the saw in a rigid attitude with the cutting element 50 in a vertical plane.

The power saw 48 illustrated is of a conventional type powered by an electric motor enclosed within a housing 68. A guard 70 surrounds the upper portion of the cutting element 50 to protect the operator's hand from engagement with the cutting element and to divert any sparks or cut particles in a downward direction. Electric current is conducted from a power source (not shown) through electrical line 72 into the handle 66, through a trigger switch 74 (FIG. 1) and thence to the motor in the customary fashion.

To raise and lower the saw and saw support arm with respect to the base, a lever arrangement is provided including an operating lever 76 pivotally mounted to the channel member 22 by a bolt 78. The rear end of the operating lever is pivotally connected at 80 to the upper end of a link 82. The lower end of link 82 is pivotally mounted on the shaft of a screw 84 which serves to tighten the bifurcated end of a collar 86 on post 18. Handle 88 permits the tightening or loosening of the screws 84 to permit adjustment of the collar position. The collar 86 serves both as a support for the lower end of link 82, and also as a support for the lower end of a compression coil spring 90 disposed around the post 18. The upper end of spring 90 bears against the bottom of the slide element 24 and accordingly serves to retract the saw and saw support arm to the raised position upon release of the operating lever 76.

The downward travel of the saw and saw support arm is limited by an adjustable stop 92 which as shown in FIG. 7 comprises a collar member having an adjusting screw 94 and handle 96 of a construction quite similar to the collar 86 shown in FIG. 6. The upper surface of the stop 92 engages the lower surface of slide element 26 to stop the downward movement of the saw and saw support arm at a predetermined height.

Means are provided for clamping the work piece to be cut at a predetermined position beneath a saw cutting element. In the illustrated embodiment, this means comprises an adjustfence 98 and a quick-adjusting clamping assembly 100 adapted to clamp the work piece 102 against the fence 98 in a vise-like manner. The fence 98 is adjustably positioned by means of the bolt 104 shown in FIG. 9 having a T-head 106 adapted to slide within a slot 108 in the base table surface 12. The bolt 104 passes upwardly through the fence 98 and secures the fence against the table surface upon tightening of nut 110 thereto. The fence 98 is normally aligned as illustrated perpendicularly to the plane of travel of the cutting element 50 of the saw and is normally adjusted along the slot 108 in a position which aligns the longitudinal center line of the work piece with the center line C of the cutting element.

The clamping assembly 100 comprises a clamping element 112 as shown in FIG. 8 which includes a downwardly directed tongue 114 which slidably engages the slot 108. A socket 116 receives the ball end of a clamping screw 118 carried by the threaded barrel 120 of the slotted support member 122. Handle 124 facilitates the rotation of the screw 118 to advance the clamping element 112 against the work piece 102. The support member 122 includes an inverted T-shaped member 126 which is pivotally pinned thereto at 128. The member 126 is freely slidable along the slot 108 with the T-shaped portion extending below the slot. Offset lugs 130 on member 122 as shown most clearly in FIG. 1 cause a binding of the T-shaped member 126 when the screw 118 is tightened, but the member 126 is freely slidable upon loosening of the screw to permit readjustment of its position.

A slot 132 is provided in the table surface 12 to permit free passage of the cutting element 50 of the saw. A collector 134 fitted with a conduit 136 leading to a waste container (not shown) is provided to direct the sawn particles, dust, sparks, etc. away from the work table for collection in a suitable container.

For operation, the portable electric saw is clamped into position by means of the screws 58 and the U-bolt 64 and the pins 42 and 46 are adjusted to place the saw support arm in the desired position with respect to the channel member 22. The stop 92 is adjusted on the post 18 to provide the desired lower limit position of travel of the saw. The position of collar 86 as well as the bolt 78 are also adjusted as desired to provide a convenient initial position and path of travel of the operating lever 76. The fence 98 is adjusted to center the longitudinal center line of the work piece 102 with the center line of the saw cutting element 50, and the nut 110 is tightened to secure the fence in position. The work piece 102 is then positioned transversely along the fence 98 until the desired line of cut is aligned with the plane of travel of the saw cutting element 50. The clamping assembly 100 is then slid toward the work piece 102 until the clamping member 112 engages the work piece, at which time the screw 118 is rotated by means of handle 124 to clamp the work piece in a vise-like grip. The operator then turns on the saw by depressing the trigger switch 74 with one hand and with the other hand swinging the operating lever 76 downwardly to engage the saw cutting element 50 with the work piece 102. The downward movement is continued until the cutting element has cut through the work piece as shown in broken lines in FIG. 1. The operating lever is then returned to the raised position and the saw stopped by release of the trigger switch prior to removal of the work piece by release of the screw 118. The spring 90 holds the saw in the raised position ready for the next cutting operation.

It will be apparent that the present apparatus may be utilized for cutting slots in the work piece rather than cutting completely through the work piece or for other specialized cutting operations which do not require a severing of the material. If desired, the trigger switch 74 may be by-passed and a remote switch provided for starting the portable saw. For production work, a foot operated switch may be preferred.

The operating lever 76 provides a mechanical advantage allowing a substantial force to be applied by the cutting element 50 against the work piece while requiring a relatively light force on the outer end of the lever by the operator. The rate of cut may be far more accurately controlled with this arrangement and the operator will not become fatigued even in the course of a repetitive cutting assignment.

The rigid clamping of the work piece to the base and the rigid attachment of the power saw to the saw support arm ensures a straight precisely aligned cutting stroke of the saw, thereby preventing damage to the saw cutting element in addition to providing an improved sawing operation. The present saw holder accordingly permits an accuracy of operation which could not be achieved by using the same portable saw in a hand-held operation.

All types of materials may be cut with the present device including a variety of metals, plastics, wood, ceramics, etc. The device is best suited for cutting lengths of elongated materials which may be in the form of rods, sheets, bars, angles or extruded shapes.

The saw holder may be modified as desired to support different makes and models of portable saws, but it is recognized that some modifications of the saw support arm may be required to accommodate other types of saws. The present design has proven particularly effective with a saw of 1½ horsepower capacity.

Manifestly, changes in details of construction can be effected by those skilled in the art without departing from the spirit and scope of the invention as defined solely by the appended claims.

I claim:
1. A power saw holder comprising a base, a horizontal table surface on said base for supporting material to be cut, a support post extending vertically from said base, a saw support arm mounted for vertical sliding movement in a predetermined plane on said support post, said saw support arm being adjustably connected to a vertically disposed channel member, said channel member having vertically spaced slide elements extending therefrom, said slide elements being apertured to receive said support post in slidable relation, lever means for selectively lowering and raising said saw support arm with respect to said base, said lever means including an operating lever pivotally connected to said channel member and having one end thereof pivotally connected to one end of a link, a collar member adjustably secured to said post, said link being pivotally connected to said collar member at the end thereof opposite the connection to said operating lever, said lever means providing a substantial mechanical advantage for movement of said arm, means on said saw support arm for demountably attaching a normally hand-held portable power saw thereto with the cutting element thereof disposed in a vertical plane, spring means cooperatively connected with said saw support arm effective to return said arm and saw to a raised position upon release of said lever means, said spring means including a coil spring disposed around said post between said adjustable collar member and one of said slide elements, said adjustable collar member cooperating with one of said slide elements to limit the upward movement of said saw support arm, and means on said base for selectively clamping a work piece for engagement by the power saw cutting element upon downward movement thereof.

2. The invention as claimed in claim 1 including an adjustable stop on said post for limiting the downward travel of said saw support arm.

3. The invention as claimed in claim 1 wherein said post is rectangular in cross-section.

4. The invention as claimed in claim 1 wherein said means on said base for selectively clamping a work piece comprises a fence adjustably secured to said base, and a clamping assembly having screw means for clamping a work piece against said fence.

5. The invention as claimed in claim 1 including collecting means on said base for collecting dust and particulate matter discharged from the power saw during the cutting operation.

6. The invention as claimed in claim 1 including a slot in said table surface for passage of the saw cutting element.

* * * * *